F. J. MACKIN.
MAKING NARROW NECK BOTTLES.
APPLICATION FILED AUG. 10, 1912.

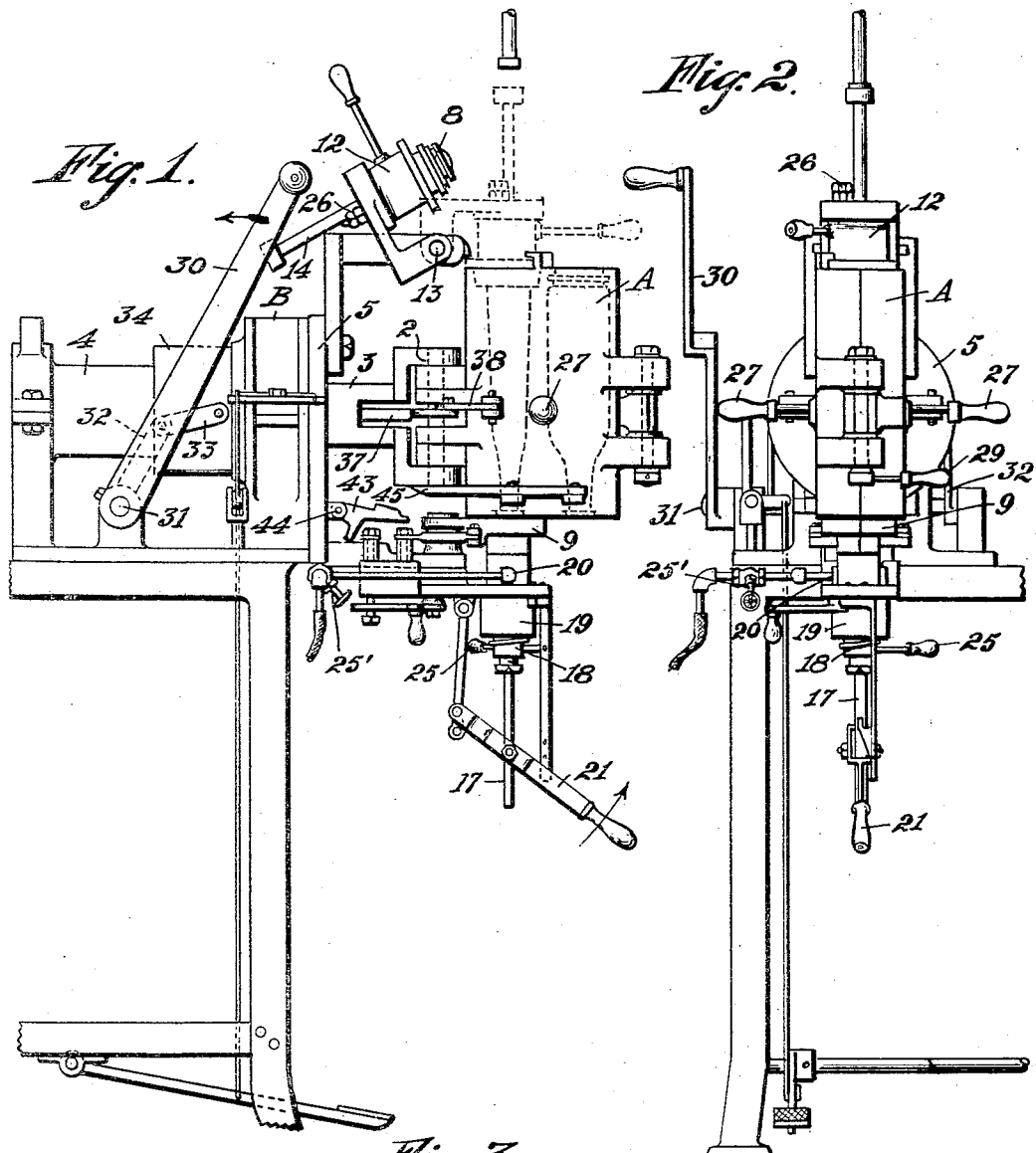
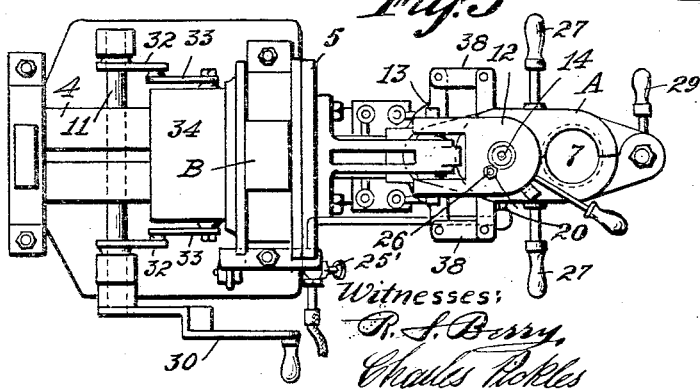

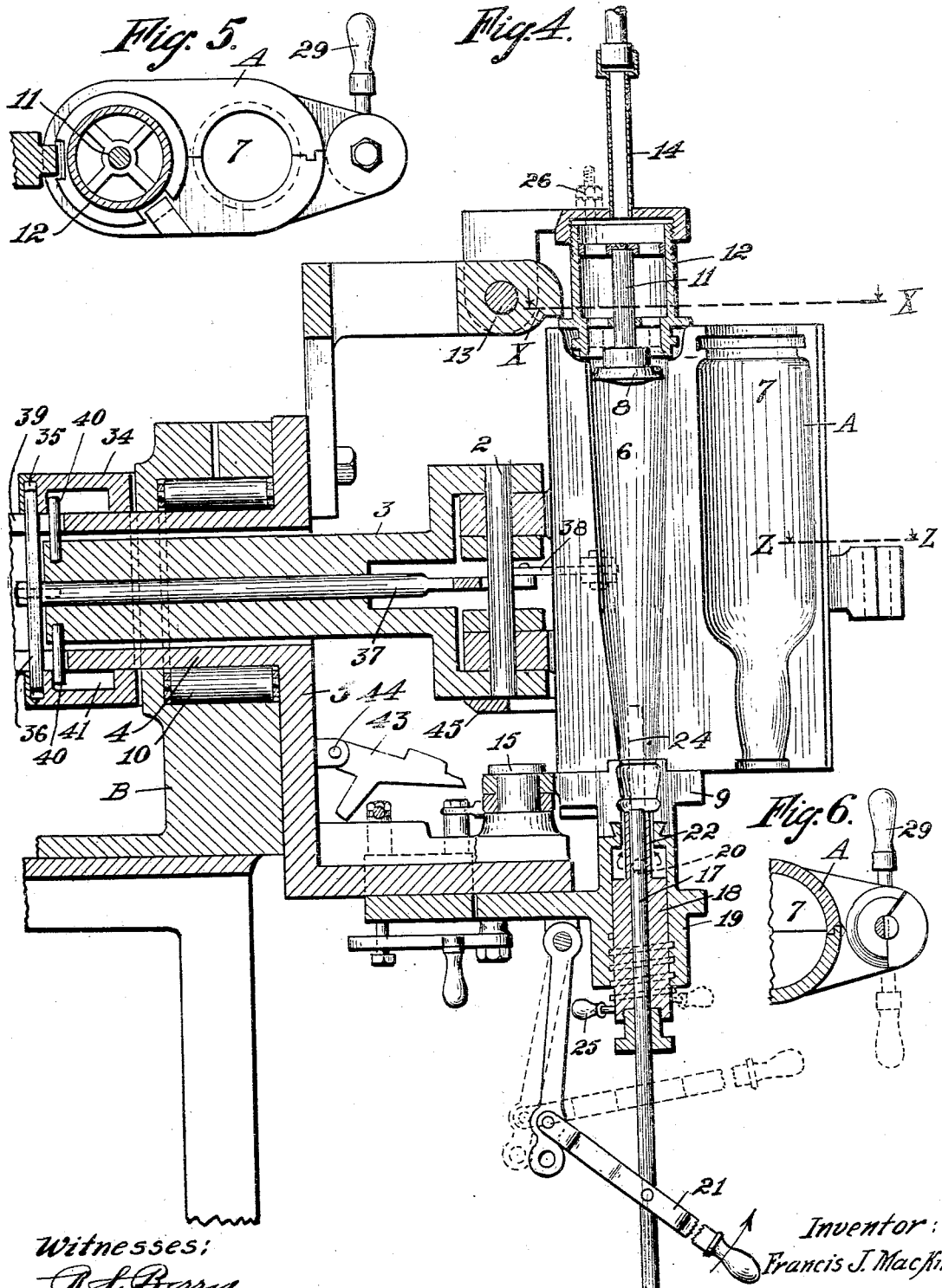

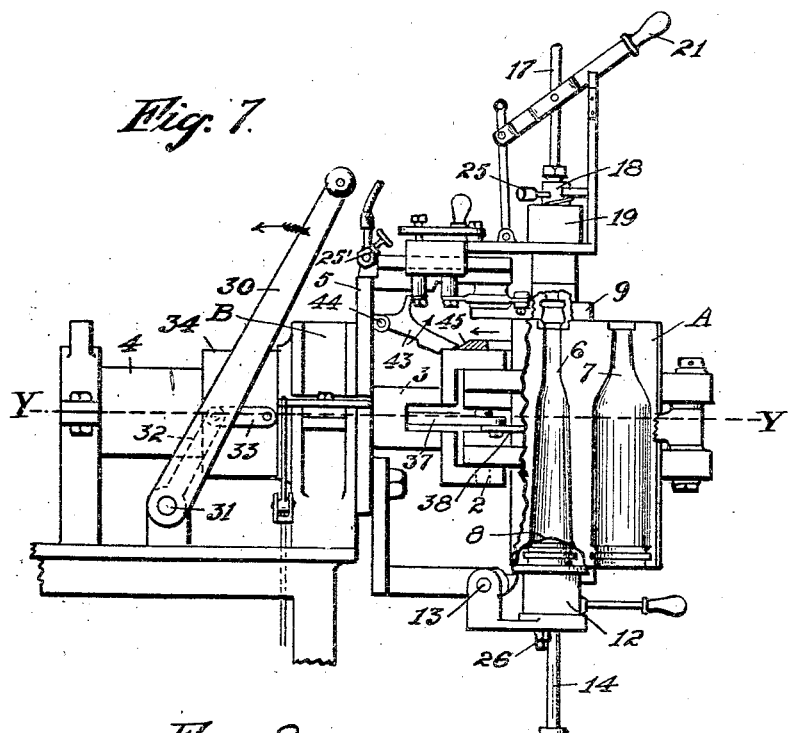
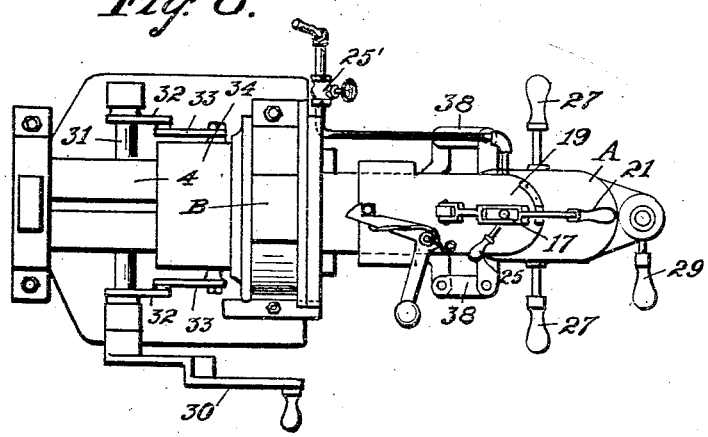

1,148,701.

Patented Aug. 3, 1915.
4 SHEETS—SHEET 4.

Witnesses:
R. S. Berry,
Charles Pickles

Inventor:
Francis J. Mackin
By G. H. Strong.
Atty.

UNITED STATES PATENT OFFICE.

FRANCIS J. MACKIN, OF SAN FRANCISCO, CALIFORNIA, ASSIGNOR, BY DIRECT AND MESNE ASSIGNMENTS, TO MACKIN BOTTLE MACHINE CO., OF RENO, NEVADA, A CORPORATION OF NEVADA.

MAKING NARROW-NECK BOTTLES.

1,148,701.   Specification of Letters Patent.   Patented Aug. 3, 1915.

Application filed August 10, 1912. Serial No. 714,361.

*To all whom it may concern:*

Be it known that I, FRANCIS J. MACKIN, a citizen of the United States, residing at the city and county of San Francisco and State of California, have invented new and useful Improvements in Making Narrow-Neck Bottles, of which the following is a specification.

This invention relates to the manufacture of hollow glassware, and pertains especially to a machine for making narrow-neck bottles.

The objects of the invention are briefly these: To successfully blow a narrow-neck bottle by machinery and blow the blank in a blank mold the full bottle length, supporting the blank on the neck ring and bottom plate, while a bottle mold is substituted for the blank mold and then with the blank still supported on the bottom plate and ring, blowing the blank to bottle size; to use the bottom plate of the bottle mold as the blower to blow the glass into the finish or neck-ring in the blank mold, and also to use the same bottom plate to form the bottom of the blank; to form the blank and blow molds in one casting, whereby an even heat is maintained in the casting, making the finished bottle stronger, because the pores of the glass are not closed by a sudden shock as where separate molds with separate castings are employed and where it is almost impossible to keep both at the same temperature.

Figure 9:
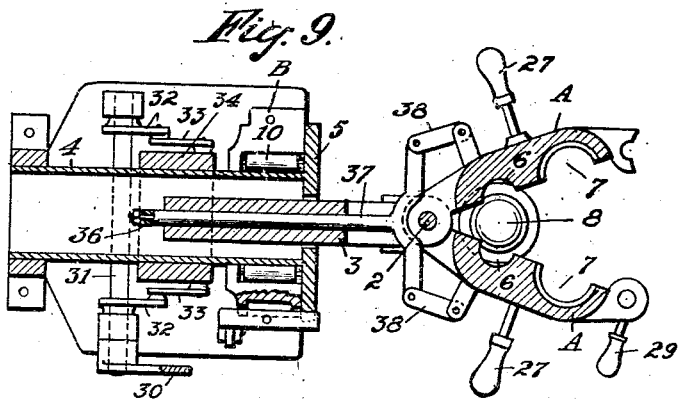
Figure 10:
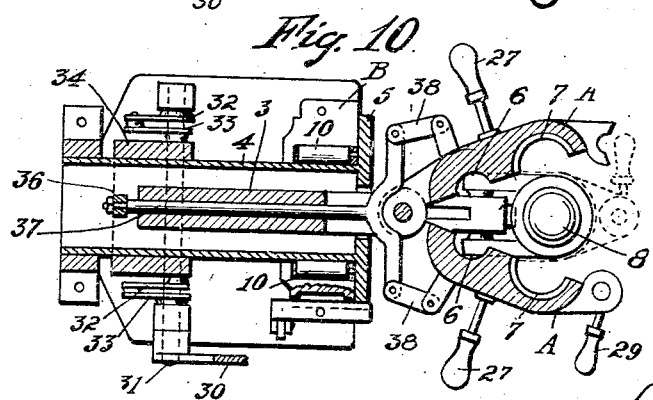
Figure 11:
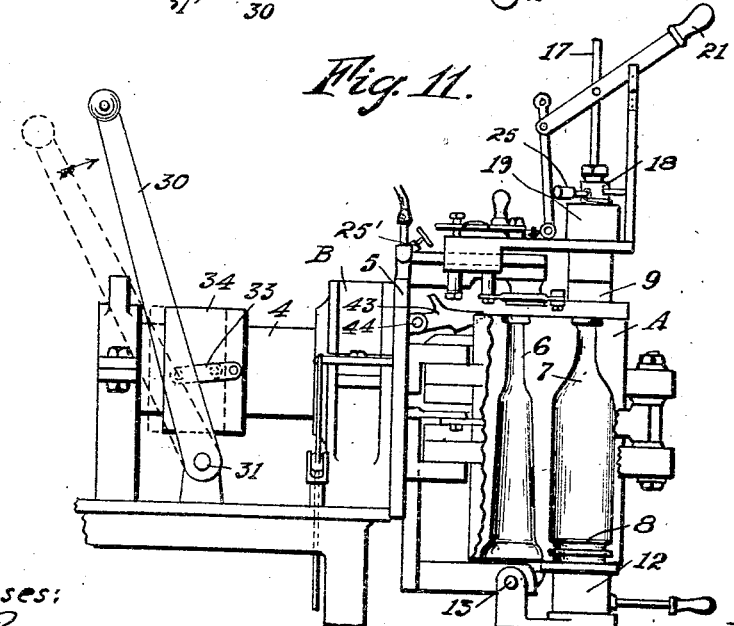

Having reference to the accompanying drawings—Figure 1 is a side elevation representing one form of the invention. Fig. 2 is an end view of the same. Fig. 3 is a plan view. Fig. 4 is a vertical section of the apparatus showing the interior of one of the mold sections in elevation. Fig. 5 is a section on X X, Fig. 4. Fig. 6 is a detail of a locking joint of the mold on the line Z—Z of Fig. 4. Fig. 7 is a side elevation with the mold in reversed position, to that shown in Fig. 1, parts being broken away. Fig. 8 is a plan view of the same. Fig. 9 is a horizontal section on line Y—Y, Fig. 7, with the molds open and ready to be retracted to transfer the blank from the blank mold to the blow mold. Fig. 10 is a similar view showing the parts after the transfer. Fig. 11 is a side elevation of the machine in the position indicated in Fig. 10, with parts broken away.

A represents a two-part mold casting hinged at 2 to a horizontally disposed axle 3, which latter is shiftable endwise in a hub 4 of a reversible frame 5. Frame 5 is suitably mounted for oscillation on an axis, which axis is coaxial with axle 3, so as to turn the axle and mold casting A, in which latter is formed the blank mold 6 and bottle mold or blowing mold 7 from inverted to upright position and vice versa; the bottom plate 8 and neck ring 9 being reversible in unison with the mold casting. To effect this reversibility, frame 5 is shown as being provided with a hollow hub 4 turning in roller bearings 10, in a stationary part B of the machine; the hub 4 forming a bearing for the axle 3, which latter is square in cross section, sliding in a corresponding bore in hub 4.

The axle 3 has a limited endwise movement in the hub 4, sufficient to carry the mold casting from a position with the neck ring 9 and bottom plate 8 in co-acting register with the blank mold 6, as shown in Figs. 1 and 7, to a position where the bottle or blowing mold 7 is in co-acting register with the neck ring 9 and bottom plate 8, as shown in Figs. 10–11.

The bottom plate 8, Fig. 4, is in the form of a valve having a valve stem 11, operating in a valve casing 12, which is pivoted at 13 to an arm on the reversible frame 5, and has a hose or other suitable, flexible connection 14, with a source of air supply.

The neck ring 9 is made in two parts hinged at 15 to an arm on frame 5 on the side of axle 3 opposite to the bottom plate 8, which neck ring is shaped with a suitable cavity corresponding to the desired contour to be given the bottle neck. The neck ring is made in two parts to open and close in the usual manner and is worked independently of the two parts of the mold casting A. The manner of opening and closing the neck ring and the mold will be explained shortly. Co-acting with the neck ring is a neck ring plunger 17 sliding in an adjustable screw plug 18 carried in the valve casting 19. Valve casting 19 has an air connection at 20 by which air may be admitted into the cavity formed by the neck ring plunger 17 to blow the blank to its full length; the reciprocation of the plunger rod 17 being effected by suitable means as the hand-lever 21. Normally, plunger 17 is below the lowest point of the blank and out of interference therewith.

Valve casting 19, neck ring 9 and bottom plate 8 (except when the latter is turned back into the full line position shown in Fig. 1) are maintained substantially in axial alinement during the bottle making operation, with the blank supported between the neck ring and bottom plate 8 while the mold A is shifted so that the blank becomes transferred from the blank mold 6 to the blowing mold or bottle mold 7; the mode of operation being as follows: In practice, with the parts in the position of Fig. 1, and the molds locked and closed, and the bottom plate 8 with its valve casing 12 turned backward on its pivot 13, the glass gatherer deposits the gather in the mold 6. Immediately thereafter, bottom plate 8 and its cover are closed over the inverted end of the blank mold 6 and air admitted past the bottom plate 8 to blow the gather into the finish of the neck ring; the glass in the bottom of the neck ring being temporarily supported by the retracted end of the plunger 17, and its co-acting guide sleeve 22 formed on the hollow plug 18. As soon as the glass has been blown into the finish by the air entering around the plate 8, lever 21 is lifted to elevate plunger 17 to form a pocket 24, represented in dotted lines Fig. 4, and the neck portion of the blank; the air in pipe 14 having been turned off before plunger 17 is retracted, so as to prevent the collapse of the walls of the cavity 24. Next, the operator grasps handle 25 to turn screw plug 18 a portion of a revolution, and thereby force the collar extension 22 a slight distance up into the finish, immediately retracting same so as to leave an air passage through which the air from connection 20 may enter the cavity 24 in the neck of the blank; the air in the connection being controlled by a suitable valve 25'. The air thus admitted into the neck of the blank blows the blank to its full length; the glass as it rises in the blank mold 6 striking the bottom plate 8 and seating it. In so doing, the plate 8 lifts an indicator pin 26, showing the operator that the blank has been blown to its full length.

I believe that I am the first ever to have blown the blank to its full length in the blank mold; and to have used the bottom plate not only as a support for the blank in the blank mold, but to have used it as a valve to permit the gather to have been blown into the finish of the neck ring; and also to use this same valve-bottom-plate as a bottom-plate in the subsequent operation of blowing the blank to bottle size in the bottle or blow mold. Having blown the blank to full length in the manner described, the position of the mold casting is then reversed by turning the frame 5 through one-half of a revolution, so as to bring the molds 6—7 into an upright position, indicated in Figs. 7–11; this reversing being done in the present instance manually by means of the handles 27 on the mold casting A. This reversing of the molds also reverses the position of the neck ring and bottom plate; bringing molds 6—7 into upright position with the neck ring 9 and its various connections uppermost, and the bottom plate 8 and its carrying means 12, lowermost.

The next step is to open the mold leaving the glass blank supported by the neck ring and bottom plate 8, and next to shift the mold casting backward with the sections in opened-out position, so that when the sections are closed again, the glass blank will be contained within the blowing mold 7.

The locking and unlocking of the molds is done by a lever 29, and the opening and closing of the molds and the shifting of the molds lengthwise of axle 3 is done by a lever 30; this lever 30 being attached to a rock-shaft 31, which latter carries a pair of cranks 32, connected by links 33 with a ring 34, on hub 4. Ring 34 has a circumferential interior groove 35 to accommodate a cross-head 36, which connects with a rod 37 extending centrally through axle 3 and connecting at the opposite end by toggles 38 in such fashion that when the pivot 2 of the mold sections is held stationary, and rod 37 is moved in one direction, the mold sections will open, and when the rod 37 is moved in the opposite direction the mold sections will close.

The cross-head 36 extends out through guide slots 39 in hub 4, and turns with the hub. The endwise movement of the sleeve 34 in which the ends of the cross-head 36 work, is limited by pins 40 fixed in axle 3, and also project radially through the slots 39 in the hub and are adapted to contact with one or the other of the end walls of an inner annular cavity 41 formed on collar 34.

Ring 34 does not revolve, but is simply designed to shift end-wise on hub 4, which latter does revolve, so as to act when the lever 30 is pushed backward in the direction of the arrow, Figs. 1–7, first, to open the mold sections so that they will clear the blank, Fig. 9, and secondly, to shift the blank molds, so as to bring the bottle mold 7 into position in readiness to inclose the blank, Fig. 10.

In order to insure the opening of the molds on this backward movement of the lever 30 before the molds begin to move backward, a suitable detent as 43 Fig. 7, is provided which normally engages behind the mold casting and is only lifted so as to permit the axle 3 and mold casting to shift after the molds are fully opened. As illustrated in Fig. 7, this detent 43 is pivoted at 44 to frame 5, and is adapted to be lifted so as to release the mold by means of a cam surface 45 on one of the mold sections which is adapted to ride under the toe of the detent latch 43 and lift it.

With the lever 30 thrown backward to the limit of its movement, and the molds opened and shifted so that they stand in the position of Fig. 10, the next operation is to close the molds for the blowing operation. This is done by a slight reverse movement indicated by the arrow, Fig. 11, of lever 30; it being understood that lever 30 can be shifted backward to the desired extent to close the mold without moving the mold or axle 3 endwise, by virtue of the play allowed by the slot 41 in the collar 34. Having closed and locked the mold, the bottle is blown by admitting air through valve 25' in the neck ring.

When the bottle is blown to full size, the air is turned off, the neck ring and molds opened and the bottle removed; and then by a further movement of lever 30, the closed molds are returned to the position indicated in Fig. 7, after which the molds are reversed; the bottom plate coming uppermost to be thrown open, as shown in full lines Fig. 1, ready for a repetition of the cycle of operation.

The bottom plate 8 may be inscribed by the trade-mark, lettering or design desired by the party for whom the articles are made. This bottom plate comes in contact with the glass when in the blank mold, so that the letter or design is blown then. The blank cannot be too long or too short. It does not have to run by gravity to the bottom plate in the blow mold; the distinguishing feature of this invention being that the blank is not only blown to its full bottle length in the bottle mold, but the blank and bottle at all stages of the operation, during and after the initial blowing of the blank, is supported by the bottom plate and neck ring so that the blank is prevented from lengthening. The glass is centered so as to make a bottle of even thickness on the bottom. I am also able to have heavy-bottom bottles when desired, by regulating the amount of air pre-blown into the blank, and the speed with which it is blown.

It is understood that the reversing frame 5 is not directly connected with, nor does it carry the molds, except as they are supported on axle 3 for sliding movement in the hub 4, but this frame 5 is designed primarily, to provide suitable supports for the bottom plate and neck ring mechanisms and maintain them in proper registerable position, with respect to the molds, whether the latter are in inverted or upright position.

The formation of the blank and blow molds in one casting is important, in that it provides for a uniform heat for both molds, so that the glass suffers no deterioration by reason of being moved from one mold to another, as would be the case where the molds are separate and where it is practically impossible to have both of them at the same heat.

By my construction, actual experience with this machine shows that the finished bottle is much stronger than where bottles are made in separate molds, disconnected from one another.

Having thus described my invention, what I claim and desire to secure by Letters Patent is—

1. In a glass blowing machine, the combination of an oscillating frame, a neck ring and bottom plate carried thereby, suitable air connections in conjunction with the bottom plate and neck ring, means for reversing the position of the plate and ring, a blank mold and a bottle mold, turnable in unison with the plate and mold and means whereby the molds are moved in unison to cause one mold to register with the ring and plate and then to cause the other mold to register with the ring and plate by which the blank is blown to its full length in the blank mold and then transferred to the bottle mold, being supported in both blowing operations by said neck ring and said bottom plate.

2. In a bottle making machine, the combination of a blank mold and a bottle mold operable in unison, means for turning the molds simultaneously from an upright to an inverted position and vice versa, means for reciprocating the molds at right-angles to their length, a bottom plate and neck ring, into register with which said molds are successively brought by the reciprocation of the molds, and air connections with both the bottom plate and neck ring by which air may be admitted at either end of the molds.

3. In a bottle making machine, the combination of a blank mold and a bottle mold operable in unison, means for turning the molds simultaneously from an upright to an inverted position and vice versa, means for reciprocating the molds at right-angles to their length, a bottom plate and neck ring, into register with which said molds are successively brought by the reciprocation of the molds, air connections with both the bottom plate and neck ring by which air may be admitted at either end of the molds, and means by which the bottom plate and neck ring change their positions from a point above the molds to a point below the molds and vice versa in unison with the reversing of the molds.

4. In a bottle making machine, the combination of a blank mold and a bottle mold operable in unison, means for turning the molds simultaneously from an upright to an inverted position and vice versa, means for reciprocating the molds at right-angles to their length, a bottom plate and neck ring, into register with which said molds are successively brought by the reciprocation of the molds, air connections with both the bottom plate and neck ring by which air may be admitted at either end of the molds, and means by which the bottom plate and neck ring change their positions from a point above the molds to a point below the molds and vice versa in unison with the reversing of the molds, said blank mold and bottle mold being of the same length whereby the blank is blown to full bottle length in the blank mold and said bottom plate and neck ring constructed and arranged to support the blank when transferred from the blank mold to the bottle mold.

5. In a bottle blowing machine, the combination of a neck ring and bottom plate and an intermediate mold, the neck ring and bottom plate mounted on a frame by which the neck ring and plate may be swung in unison through an arc of 180°, and means for mounting the mold so that it will turn in unison with the neck ring and bottom plate, the said neck ring and the said bottom plate coacting to support the contained article in the mold in whichever of its reversed positions the mold is in and during all the blowing operations.

6. In a bottle blowing machine, a blank mold and a bottle mold formed in one integral casting, the casting made in two parts and hinged so that both molds open or close simultaneously, and a neck ring and bottom plate, said bottom plate constructed with means to blow the glass into the neck ring in the blank mold and also to support the bottom of the blank in both molds.

7. In a bottle making machine, the combination of a blank mold and a bottle mold formed in one casting, the blank mold of the same length as the bottle mold, and a single bottom plate and a single neck ring for both molds, means for positioning the molds successively with respect to the neck ring and bottom plate, and means by which air may be admitted successively past the bottom plate and through the neck ring.

8. In a bottle making machine, the combination of a blank mold and a bottle mold formed in one casting, the blank mold of the same length as the bottle mold, and a single bottom plate and a single neck ring for both molds, means for positioning the molds successively with respect to the neck ring and bottom plate, means by which air may be admitted successively past the bottom plate and through the neck ring, and means by which the molds, neck ring and bottom plate are turnable in unison to bring the molds from an upright to an inverted position, and vice versa.

9. The combination of a pair of integrally connected molds, one for blowing the blank and one for blowing the bottle from the blank, a bottom plate and a neck ring, means in conjunction with the bottom plate for admitting air under pressure to blow the gather into the neck ring, means in conjunction with the neck ring to subsequently blow the blank the full bottle length in the blank mold and support the blank on said bottom plate, means for reversing the mold while the blank is still in the blank mold and supported by the bottom plate and neck ring, and means for transferring the blank to the bottle mold while the blank is supported by said bottom plate and neck ring.

10. The combination of a pair of integrally connected molds, one for blowing the blank and one for blowing the bottle from the blank, a bottom plate and a neck ring, means in conjunction with the bottom plate for admitting air under pressure to blow the gather into the neck ring, means in conjunction with the neck ring to subsequently blow the blank the full bottle length in the blank mold and support the blank on said bottom plate, means for reversing the mold while the blank is still in the blank mold and supported by the bottom plate and neck ring, and means for transferring the blank to the bottle mold while the blank is supported by said bottom plate and neck ring, said blank mold and bottle mold of the same length whereby the blank is blown the full bottle length in the blank mold.

11. In a bottle blowing machine, the combination of a reversible frame turnable on a horizontal axis, said frame carrying a bottom plate and a neck ring on opposite sides of its axis, a mold open at the ends and registerable with the bottom plate and neck ring, suitable air connections for admitting air under pressure to the mold in conjunction with both the neck ring and bottom plate, and means by which the mold is reversible in unison with said frame, the said neck ring and bottom plate serving to support the article in the mold during the entire blowing operations.

12. In a bottle making machine, the combination of a blank mold main body and a bottle mold main body movable in unison, means for closing the ends of said main bodies, means for moving said main bodies whereby said closing means can be applied to either, means for moving the closing means for one end toward the closing means for the other end, and means for directing compressed air through the end closed by said movable closing means.

In testimony whereof I have hereunto set my hand in the presence of two subscribing witnesses.

FRANCIS J. MACKIN.

Witnesses:
WALTER REIMERS,
GENEVIEVE S. DONELIN.